(12) United States Patent
Yonezawa et al.

(10) Patent No.: US 6,601,115 B1
(45) Date of Patent: Jul. 29, 2003

(54) COMMUNICATION PROTOCOL CONVERTER SYSTEM AND MONITOR DEVICE

(75) Inventors: Shiro Yonezawa, Tokyo (JP); Hirofumi Ohuchi, Tokyo (JP); Yoshikazu Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 383 days.

(21) Appl. No.: 09/598,513

(22) Filed: Jun. 21, 2000

(30) Foreign Application Priority Data

Nov. 29, 1999 (JP) ............................................. 11-337760

(51) Int. Cl.[7] ................................................. G06F 3/00
(52) U.S. Cl. ......................... 710/11; 709/230; 370/464; 710/5
(58) Field of Search ................................ 710/5, 11, 60; 370/464, 466

(56) References Cited

U.S. PATENT DOCUMENTS 6,259,706 B1 * 7/2001 Shimada ..................... 370/466
6,400,729 B1 * 6/2002 Shimadoi et al. ........... 370/466
6,405,254 B1 * 6/2002 Hadland ...................... 709/230
6,434,644 B1 * 8/2002 Young et al. ................. 710/63

FOREIGN PATENT DOCUMENTS

JP          07-319783 A       12/1995

* cited by examiner

*Primary Examiner*—Jeffrey Gaffin
*Assistant Examiner*—Niketa Patel
(74) *Attorney, Agent, or Firm*—Sughrue Mion, PLLC

(57) ABSTRACT

It is an object of the present invention to provide a communication protocol converter system, which can handle a plurality of communication protocols. Communication protocol set information for an electronic control device 101 set by a personal computer 106 is sent to a variable protocol converter means 108a in an interface device 107. The variable protocol converter means 108a changes a communication protocol control program based on the communication protocol set information.

16 Claims, 17 Drawing Sheets

FIG. 3

| MICROCOMPUTER MANUFACTURER | MICROCOMPUTER TYPE NAME | COMMUNICATION PROTOCOL | COMMUNICATION SPEED | VOLTAGE |
|---|---|---|---|---|
| A | A1 | SCIA | 10kbps | 5V |
|   | A2 | JTAG | 1Mbps | 5V |
|   | A3 | NEXUS | 100kbps | 5V |
| B | B1 | NEXUS | 100kbps | 5V |
|   | B2 | SCIB | 10kbps | 5V |
|   | B3 | NBD | 1Mbps | 5V |
| C | C1 | ......... | 20.4kbps | 3.3V |
|   | C2 | | 1Mbps | 3.3V |
|   | C3 | ......... | 500kbps | 3.3V |

FIG. 5

| COMMUNICATION PROTOCOL | TERMINAL NUMBER | | | | | | | |
|---|---|---|---|---|---|---|---|---|
| | 1 | 2 | 3 | 4 | 5 | 6 | 7 | 8 |
| SCIA, SCIB | CLK | DATA | | | | | | |
| JTAG | TCK | TMS | TRST | | TDO | TDI | | |
| NBD | CLK | /SYNC | /RST | MD | DATA0 | DATA1 | DATA2 | DATA3 |
| NEXUS | TCK | TMS | TRST | | TDO | TDI | | |
| RTD | CLK | ACK | TXD | RXD | | | | |
| PROTOCOL A | ***** | ***** | ***** | ***** | ***** | ***** | ***** | ***** |
| PROTOCOL B | ***** | ***** | ***** | ***** | ***** | ***** | ***** | ***** |

COMMUNICATION PROTOCOL CONVERTER SYSTEM AND MONITOR DEVICE

BACKGROUND OF THE INVENTION

1. Field of the Invention

The present invention relates to a control program development system or the like for an electronic control device, more particularly to a communication protocol converter system for data communication with the electronic control device with a different communication protocol and a monitor device related to the same.

2. Description of the Prior Art

FIG. 17 shows a configuration of a control program development system including a conventional communication protocol converter system. FIG. 17 includes a control apparatus 100 for a controlled object, an electronic control device 101 for controlling the control apparatus 100, a microcomputer 102, and a input/output circuit 103 from/to the side of an interface device 107. The microcomputer 102 has a RAM 102a, which is carried in the electronic control device 101, and a control program 102b built-in. FIG. 17 also includes a personal computer 106, for example, which is an outside computing portion connected to the outside, a toolbox 104 for carry out an operation based on a control block diagram created in the personal computer 106, and a microcomputer 105, which is carried in the toolbox 104.

FIG. 17 further includes an interface device 107, which is a communication interface between the toolbox 104 and the electronic control device 101, a communication protocol converter means 108, which is carried in the interface device 107, and input/output circuits 109 and 110. The input/output circuits 109 and 110 are for the side of the toolbox 104 and for the side of the electronic control device 101, respectively. FIG. 17 still further includes connectors 112, 113, and 115, 116. The connectors 112 and 113 connects a communication line between the toolbox 104 and the interface device 107, and the connectors 115 and 116 connects a communication line between the interface device 107 and the electronic control device 101.

FIG. 18 shows in more detail a configuration of the interface device 107 shown in FIG. 17. FIG. 18 includes a communication signal converter means 118, which is located within the protocol converter means 108, for converting a communication signal between the toolbox 104 and the electronic control device 101. The communication signal converter means 118 includes a clock (CLK) signal generator means 119 and a data signal generator means 120. The CLK signal generator means 119 generates a CLK signal, and the data signal generator means 12 generates a data signal.

Next, an operation will be described. The control program development system carries out an operation of a part of computing (program) operated in the electronic control device 101 through a control method created by a control application software (S/W) implemented in the personal computer 106. The operation is carried out through the toolbox 104. The operation by the toolbox 104 is carried out by using an operation parameter of the electronic control device 101. It receives the operation parameter from the electronic control device 101, carries out the operation by using the received operation parameter, and sends a operation result to the electronic control device 101.

As a specific example, suppose that the control apparatus 100 is an vehicle engine, which is controlled by the electronic control device 101, where an operation (program) for determining a time to ignite, for example is included in the control program of the electronic control device 101. In order to improve the time to ignite, suppose when an operation (program) is newly created for determining the time to ignite through the personal computer 106, it is calculated in the toolbox 104. At that time, the operation parameter needed for the operation is obtained from the electronic control device 101 via the interface device 107, and the operation result is further sent to the electronic control device 101 via the interface device 107.

Then, a series of processes will be described. First, a control (for example, creating control block diagram) is established, which is used for controlling the electronic control device 101 on the control application S/W in the personal computer 106. Next, the control created in the personal computer 106 is converted to a program code, which runs in the microcomputer 105 within the toolbox the control created in the personal computer 106, in order to carrying out an operation in the microcomputer 105 within the toolbox 104. After that, the program code is programmed in the microcomputer 105 within the toolbox 104, which enables the toolbox 104 to carry out the operation of the control created in the personal computer 106.

The control written into the microcomputer 105 within the toolbox 104 carries out the operation based on an internal parameter in the electronic control device 101 and the operation result is used for controlling the electronic control device 101. As a result, a data exchange is needed between the toolbox 104 and the electronic control device 101. Here, if the microcomputer 105 within the toolbox 104 and the microcomputer 102 within the electronic control device 101 do not have the same specification from the same manufacturer, their communication protocols of the communication function of both microcomputers differ, and they can not communicate directly.

Therefore, the interface device 107 is installed between the toolbox 104 and the electronic control device 101, and data sent from the microcomputer 105 within the toolbox 104 is converted to the communication protocol of the microcomputer 102 within the electronic control device 101 to send the data to the electronic control device 101. Also, conversely, data sent from the microcomputer 102 within the electronic control device 101 is converted to the communication protocol of the microcomputer 105 within the toolbox 104 to send the data to the toolbox 104.

Here, the communication protocol of the microcomputer 102 within the electronic control device 101 is SCI(A), and the communication protocol of the microcomputer 105 within the toolbox 104 is SCI(B). The protocol converter means 108 within the interface device 107 is set to be able to convert their communication protocol. The SCI(A) and the SCI(B) differ in their the communication speed and signal form of the communication data.

First, a CLK signal sent from the electronic device is input to the CLK signal generator means 119 within the protocol converter means 108 via the input/output circuit 110 and a B1 terminal of the protocol converter means 108. Since the microcomputer 102 within the electronic control device 101 and the microcomputer 105 within the toolbox 104 differ in communication speed, the speed of the CLK signal is converted in the CLK signal generator means 119 to send the signal to the microcomputer 105 within the toolbox 104 via an A1 terminal of the protocol converter means 108 and the input/output circuit 109.

The data signal sent from the micro computer 102 within the electronic control device 101 is input to the data signal generator means 120 via the input/output circuit 110 and a terminal B2 of the protocol converter means 108. The data signal generator means 120 converts the signal received from the electronic control device 101 to a data form for the microcomputer 105 within the toolbox 104 and synchronizes it with the speed of the signal sent from the CLK signal generator means 119 to send it to the microcomputer 105 within the toolbox 104 via a terminal A2 of the protocol converter means 108 and the input/output circuit 109.

Similarly, when data is sent from the microcomputer 105 within the toolbox 104 to the microcomputer 102 within the electronic control device 101, the signal sent from the microcomputer 105 within the toolbox 104 is converted in the data signal generator means 120 to send the data to the microcomputer 102 within the electronic control device 101.

In this way, causing the interface device 107 to convert the protocol which differs between the microcomputer within the toolbox 104 and the microcomputer within the electronic control device 101 allows a data sending/receiving function between the electronic control device and the toolbox.

The interface device 107 is manufactured so as to handle the communication protocol of the microcomputer within the electronic control device 101. Therefore, if the electronic control device 101 with a different communication protocol is used, the interface device 107 corresponding to the communication protocol within the electronic control device 101 is attached so that the toolbox 104 and the electronic control device 101 can be communicated, which realizes the control program development system.

The communication protocol converter system of the conventional program development system is configured as described above and needs an interface device inherent to a communication protocol of an electronic control device. Thus, if a targeted electronic control device is changed and the communication protocol of the electronic control device is changed, the interface device can not handle the protocol of the electronic control device, which does not allow communication between a toolbox and an electronic control device. Therefore an interface device which handles the communication protocol of the electronic control device. As a result, the same number of interface devices is needed as the number of types of communication protocol of the electronic control device for the control development. In that case, an interface device, which does not handle the communication protocol of the electronic control device, may be used by mistake, which may destroy hardware(HW) of the electronic control device and/or the interface device.

Further, it is necessary to develop an interface device corresponding to the communication protocol for each communication protocol of the electronic control device, which causes a problem of the increase in the development cost.

SUMMARY OF THE INVENTION

The present invention is made in order to resolve the problems described above. It is an object of the present invention for one type of interface device to handle a plurality of communication protocols without preparing an interface device for each communication protocol of an electronic control device and to provide a reliable communication protocol converter system without wrong setting of the protocol in the interface device.

Further, it is an object of the present invention to provide a monitor device, which can handle a plurality types of electronic control devices with different communication protocols.

In view of the objects described above, according to a first aspect of the present invention, there is provided a communication protocol converter system, comprising: an electronic control device with a microcomputer including a control program; a control and arithmetic portion with a microcomputer which operates a control program created externally by using an operation parameter from the electronic control device; and an interface device, which is connected between the control and arithmetic portion and the electronic control device, for converting a communication protocol between communication data in the control and arithmetic portion and communication data in the electronic control device; wherein the interface device includes a variable protocol converter means, which can change a communication protocol to handle one or both of the connected electronic control device and control and arithmetic portion in regard to one or both side of the electronic control device and control and arithmetic portion.

The variable protocol converter means may store a plurality of communication protocols in order to switch and change them in regard to one or both of the electronic control device and the control and arithmetic portion.

In this case, the variable protocol converter means may changes a communication protocol based on a specification of communication protocol set information of one or both of the electronic control device and the control and arithmetic portion for the variable protocol converter means through the control and arithmetic portion from the outside.

This communication protocol converter system may be arranged such that one or both of the electronic control device and the control and arithmetic portion owns their communication protocol set information, respectively, and the variable protocol converter means switches a communication protocol setting based on the communication protocol set information.

In this case, one or both of the electronic control device and the control and arithmetic portion may own their communication protocol set information, respectively, and the communication protocol converter system preferably comprises an external computing portion, which is connected to the control and arithmetic portion, for, in regard to one or both of the electronic control device and the control and arithmetic portion, inputting communication protocol set information owned by the device and a communication protocol set in the communication protocol converter means and, then, if both of them are different, notifying it.

The communication protocol converter system may further comprises an external computing portion for writing a control program directly into the electronic control device, wherein this external computing portion determines a communication protocol used in the electronic control device in a process for converting a program form and a source program to an executable program and specifies communication protocol set information of the electronic control device for the variable protocol converter means externally through the control and arithmetic portion.

According to a second aspect of the present invention, there is provided a communication protocol converter system, comprising: an electronic control device with a microcomputer including a control program; a control and arithmetic portion with a microcomputer, which operates a control program created externally by using an operation parameter from the electronic control device; an interface device with a variable protocol converter means, which is connected between the control and arithmetic portion and the electronic control device and can rewrite a communication protocol to handle one or both of the connected electronic control device and the control and arithmetic portion in regard to one or both side of the electronic control device and the control and arithmetic portion, for converting a communication protocol between communication data of the control and arithmetic portion and communication data of the electronic control device; and a communication protocol rewriting means for rewriting a communication program of the variable protocol converter means depending on a communication protocol of a device being connected in regard to one or both side of the electronic control device and the control and arithmetic portion.

The communication protocol rewriting means may include a ROM which is installed on the interface device for storing a communication protocol and a microcomputer for writing data stored in the ROM to a variable protocol converter means.

In this case, the communication protocol rewriting means may include an external computing portion for writing a communication protocol into the variable protocol converter means externally through the control and arithmetic portion.

Preferably, the communication protocol rewriting means includes a writing device connected to the outside of the interface device for writing a communication protocol into the variable protocol converter means.

In a specific form of the invention set forth above, the interface device may be equipped with input/output circuits on the side of the electronic control device and on the side of the control and arithmetic portion, respectively, and the variable protocol converter means may be equipped with a communication terminal and switches a voltage level in the input/output circuit by switching an input/output voltage level of the communication terminal based on a communication protocol set to the variable protocol converter means.

In this case, the interface device may be equipped with input/output circuits on the side of the electronic control device and on the side of the control and arithmetic portion, respectively, and a communication circuit voltage switching circuit for switching a communication voltage level thereof, and the variable protocol converter means may switch the communication circuit voltage switching circuit based on a communication protocol set to the variable protocol converter means and, thereby, switch a voltage supplied to the input/output circuit in order to switch a voltage level of the input/output circuit.

Preferably, the interface device is equipped with input/output circuits on the side of the electronic control device and on the side of the control and arithmetic portion, respectively, and the variable protocol converter means is equipped with a communication terminal and switches a voltage level in the input/output circuit by switching an input/output voltage level of the communication terminal based on a communication protocol set to the variable protocol converter means.

BRIEF DESCRIPTION OF THE DRAWINGS

FIG. 3 is an explanatory diagram of one example of a method for specifying a communication protocol of an electronic control device by a personal computer according to the present invention.

FIG. 5 shows an example of a terminal function of a connector of the side close to the interface device according to the present invention.

DESCRIPTION OF THE PREFERRED EMBODIMENT

Embodiment 1

Figure 1:
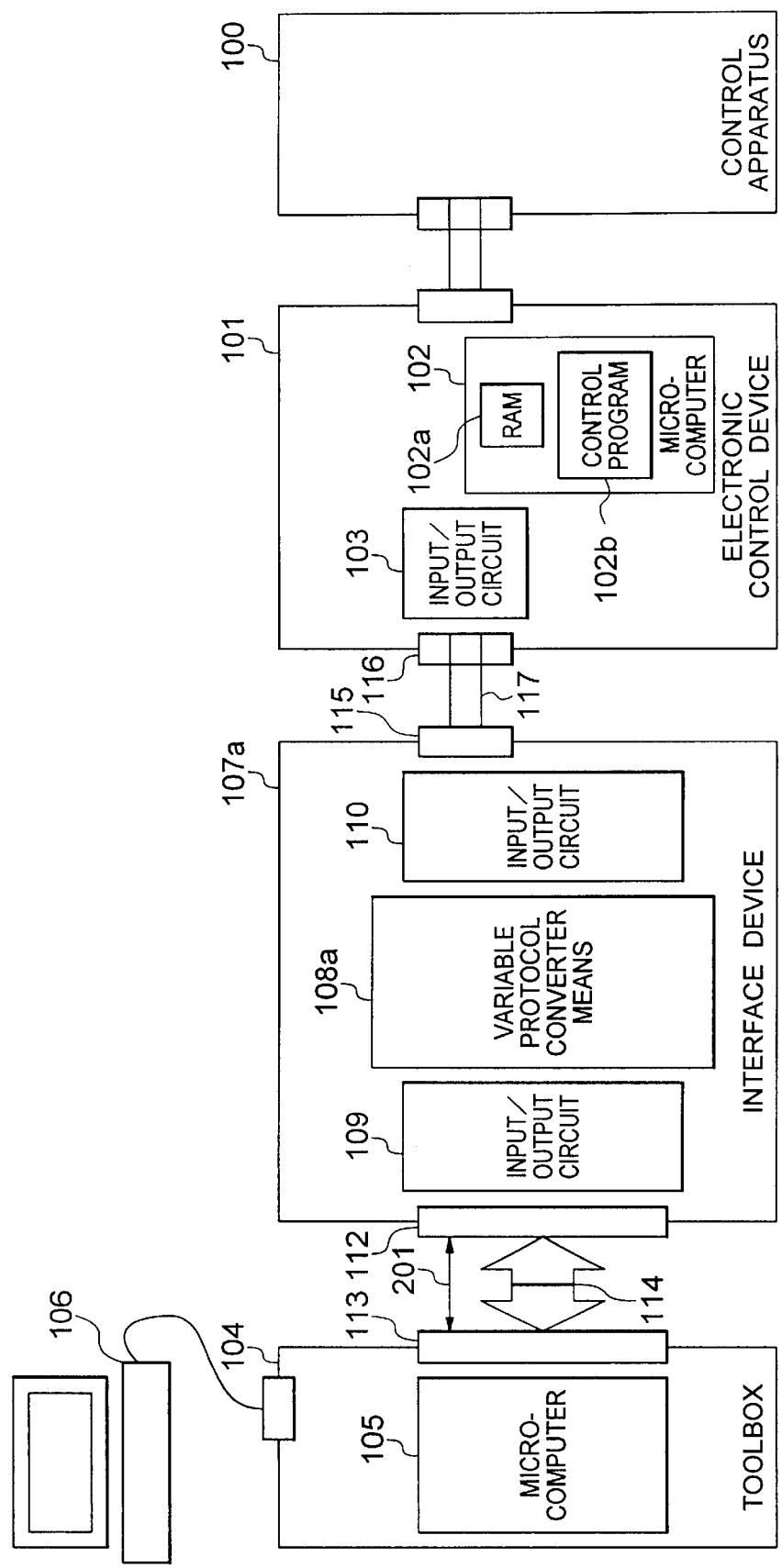
FIG. 1 shows a configuration of a control program development system including a communication protocol converter system according to an embodiment 1 of the present invention.

FIG. 1 shows a configuration of a control program development system including a communication protocol according to one embodiment of the present invention. The same numbers are given to the same or corresponding parts as the conventional one; and their descriptions are omitted (the same in the following.) FIG. 1 includes an interface device 107a according to the present invention, which includes a variable protocol converter means 108a, and a serial signal line 201 for sending a serial signal from a toolbox 104 to the variable converter means 108a. An external computing portion and a control and arithmetic portion are composed by a personal computer 106 and the toolbox 104, respectively.

Figure 2:
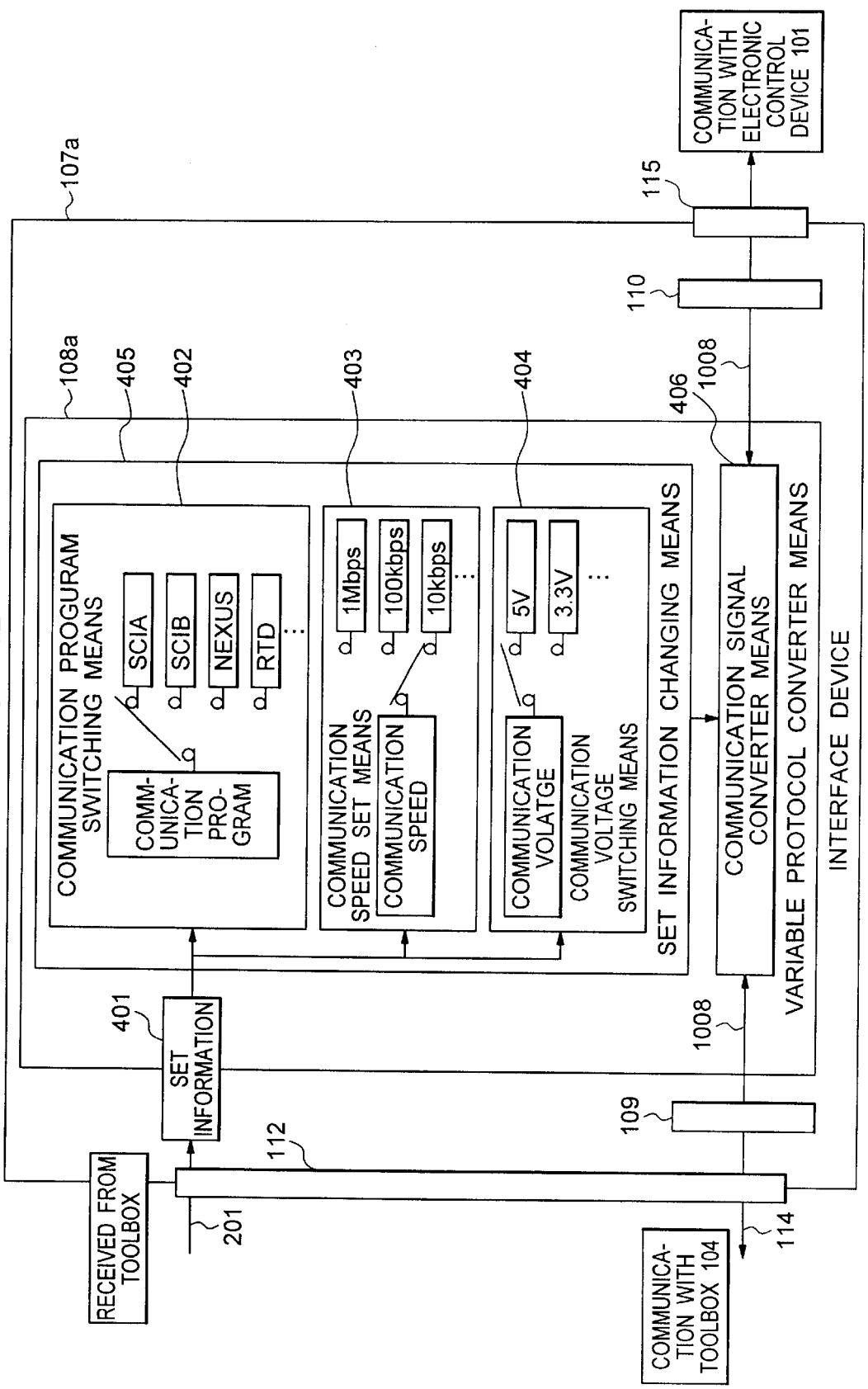
FIG. 2 shows the configuration of an interface device shown in FIG. 1 in more detail.

Next, a configuration within the interface device 107a will be described. FIG. 2 shows a configuration within the interface device 107a according to the present invention and includes setting information 401 for a communication protocol, a communication program switching means 402, a communication speed setting means 403, and a communication voltage switching means 404. The setting information 401 is set in the personal computer 106 to be sent from the toolbox 104. The communication program switching means 402 changes a communication program of the variable protocol converter means 108a. In the communication speed setting means 403, a communication speed is set. In the communication voltage switching means 404, a voltage level of a communication signal from a communication terminal 1008 of the variable protocol converter means 108a is switched. 402–404 are installed within a setting information changing means 405 (communication program area) and composed basically by a program. A communication signal converter means 406 converts a communication signal between a microcomputer 102 within an electronic control device 101 and a microcomputer 105 within the toolbox 104.

Next, an operation will be described. At the beginning of using this system, a communication protocol is set which is converted by the personal computer 106 through the variable protocol converter means 108a. FIG. 3 shows one example of a method for setting a communication protocol of the electronic control device 101 by the personal computer 106. In setting a communication protocol, the screen of the personal computer 106 displays information needed for communication including each microcomputer manufacturer and a type name for each microcomputer, a communication protocol of a communication function installed in the microcomputer, a communication speed, a voltage of a communication line and the like. A communication protocol of the microcomputer 102 used in the electronic control device 101 is selected among them, and the communication protocol is set which is converted by the variable protocol converter means 108a. Here, suppose that the communication protocol of the microcomputer 102 selects SCIA (Serial Connection Interface A), 10 kbps for the communication speed, and 5V for the communication voltage.

Once the setting for the communication in the personal computer 106 is finished, the set information is sent from the personal computer 106 to the toolbox 104. The toolbox 104 receives the set information and sent the set information 401 to the variable protocol converter means 108a, which is installed in the interface device 107a, via a communication line 201.

When the interface device 107a receives the set information, it changes the setting so that it can handle the communication protocol based on the received set information. In the set information converter means 405, the communication program switching means 402 switches the communication program to SCIA. The communication speed setting means 403 switches the communication speed to 10 kbps. The communication voltage switching means 404 switches the communication voltage to 5V.

Figure 4:
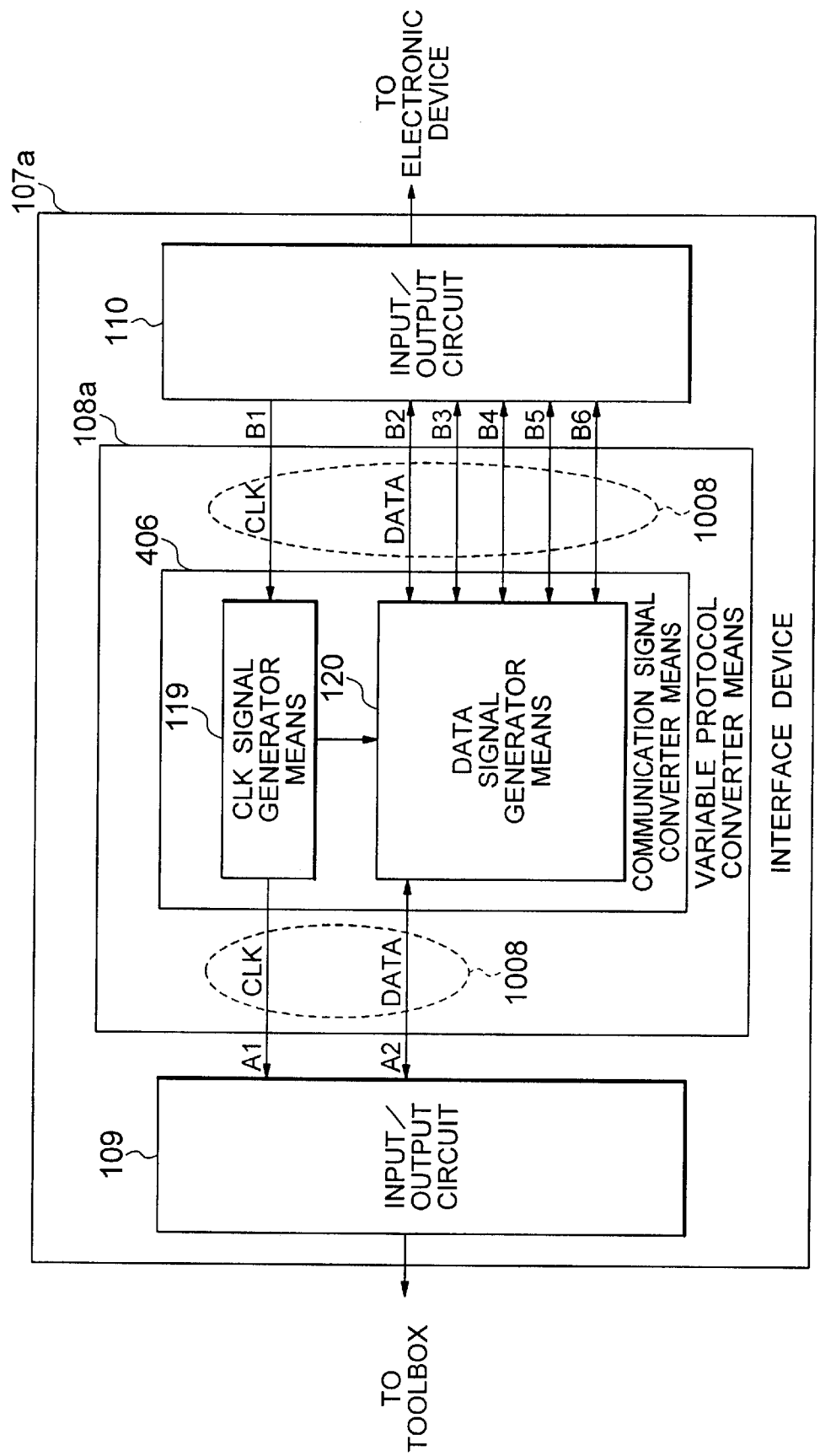
FIG. 4 shows one example of setting for the communication signal converter means installed in a variable protocol converter means within the interface device according to the present invention.

FIG. 4 shows settings for the communication signal converter means 406 located in the variable protocol converter means 108a within the interface device 107a. The set information converter means 405 is omitted. In the configuration, portions different from the conventional one will be described. Total of 4 signal terminals, A1, A2, A3 and A4, is used here for communication. Terminals B3–B6 are not used for the communication protocol of the microcomputer 102 within the electronic control device 101, but they are used when there are many communication terminals for the communication protocol of the microcomputer 102. In this embodiment, the communication is performed by using SCIA as the communication protocol and the terminals B3–B6 are empty. Therefore, a terminal setting for these terminals in the variable protocol converter means 108a is used as an output port setting such that the variable protocol converter means 108a is caused a failure by an external perturbation such as noise.

According to the changes in the setting done in the set information changing means 405, the communication signal converter means 406 converts the communication signal sent from the toolbox 104 to SCIA and send it to the microcomputer 102 within the electronic control device 101 through the 10 kbps communication speed and the 5V voltage level. Further, when sending data from the microcomputer 102 within the electronic control device 101 to the microcomputer 105 within the toolbox 104, the communication protocol SCIA for the microcomputer 105 is converted to the communication protocol for the microcomputer 105 within the toolbox 104.

Next, the operation will be described for when the electronic control device 101 used in the control program development system is changed and, then, the communication protocol for the microcomputer 102 installed in the electronic control device 101 is changed.

First, since the electronic control device is changed, the communication line 117 for connecting the electronic control device 101 and the interface device 107a may need to be exchanged with the one, which fits to a connector 116 of the changed electronic control device 101. FIG. 5 shows terminal functions of the connector 115 on the side of the interface device 107a. As shown, the terminal function of the connector 115 is changed depending on the communication protocol of the microcomputer 102 within the electronic control device 101. If the connector 116 on the side of the electronic control device 101 is formed to be common, a communication cable 117 also can be used commonly irrespective of the electronic control device 101.

The communication protocol for the microcomputer 102 in the electronic control device 101, which is changed here, is RTD (Real Time Debugger.) Its communication speed is 10 kbps, and its communication voltage is 3.3V.

Figure 6:
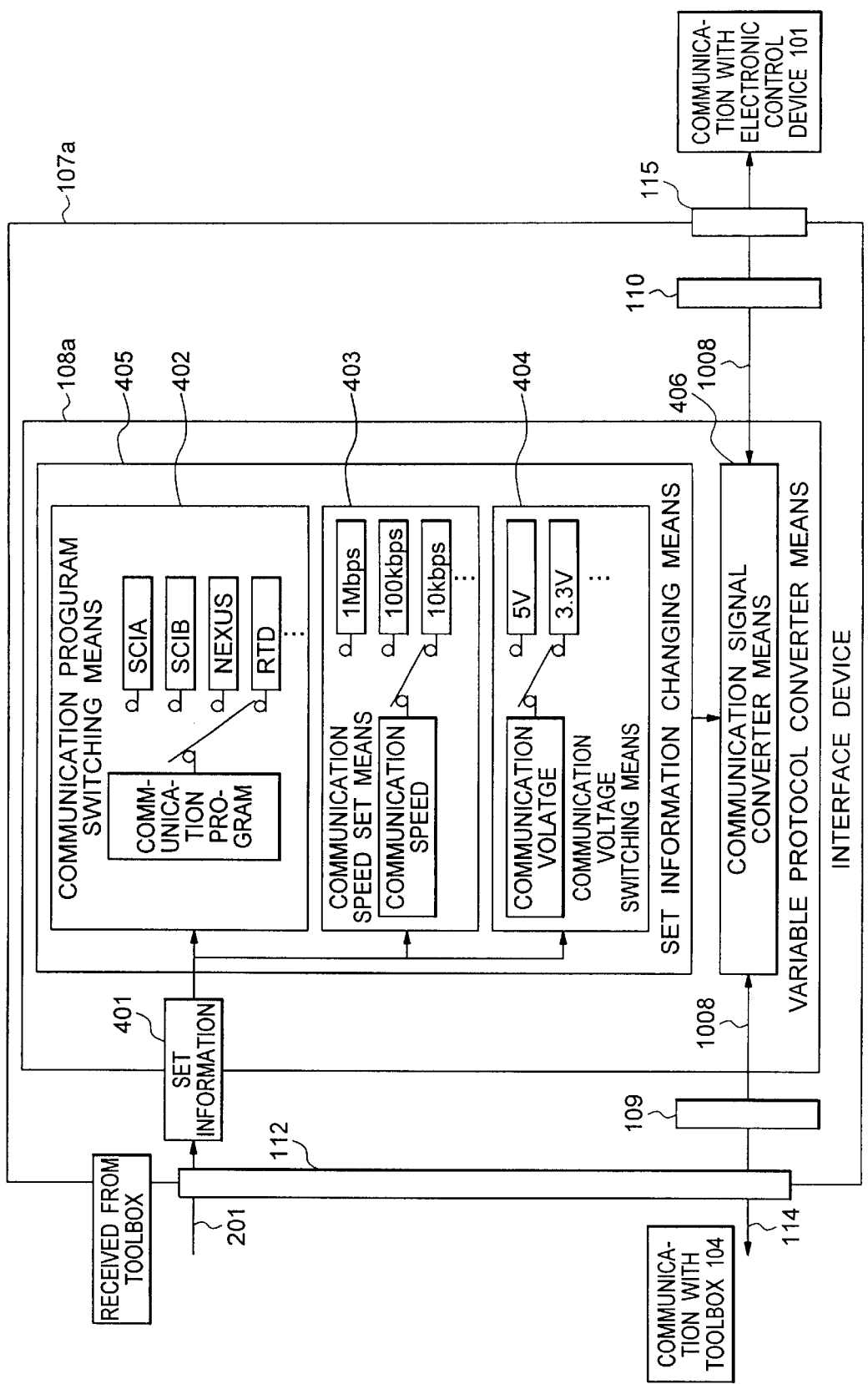
FIG. 6 shows, in more detail, a configuration of the interface device shown in FIG. 1 after the communication protocol was changed.

In FIG. 6, the interface device 107a receives set information 401 for the communication protocol of the microcomputer 102 in the electronic control device 101 from the personal computer 106 through the toolbox 104. As described above, information that the communication protocol of the microcomputer 102 in the electronic control device 101 is RTD, the communication speed is 10 kbps, and the communication voltage is 3.3V is written in the set information 401. The set information changing device 405 receives the communication protocol set information 401 and, then, causes the communication program switching device 402 to switch the communication program to RTD. Further, in the communication speed setting means 403, the communication speed is switched to 10 kbps, and the communication voltage switching means 404 is switched to 3.3V.

Figure 7:
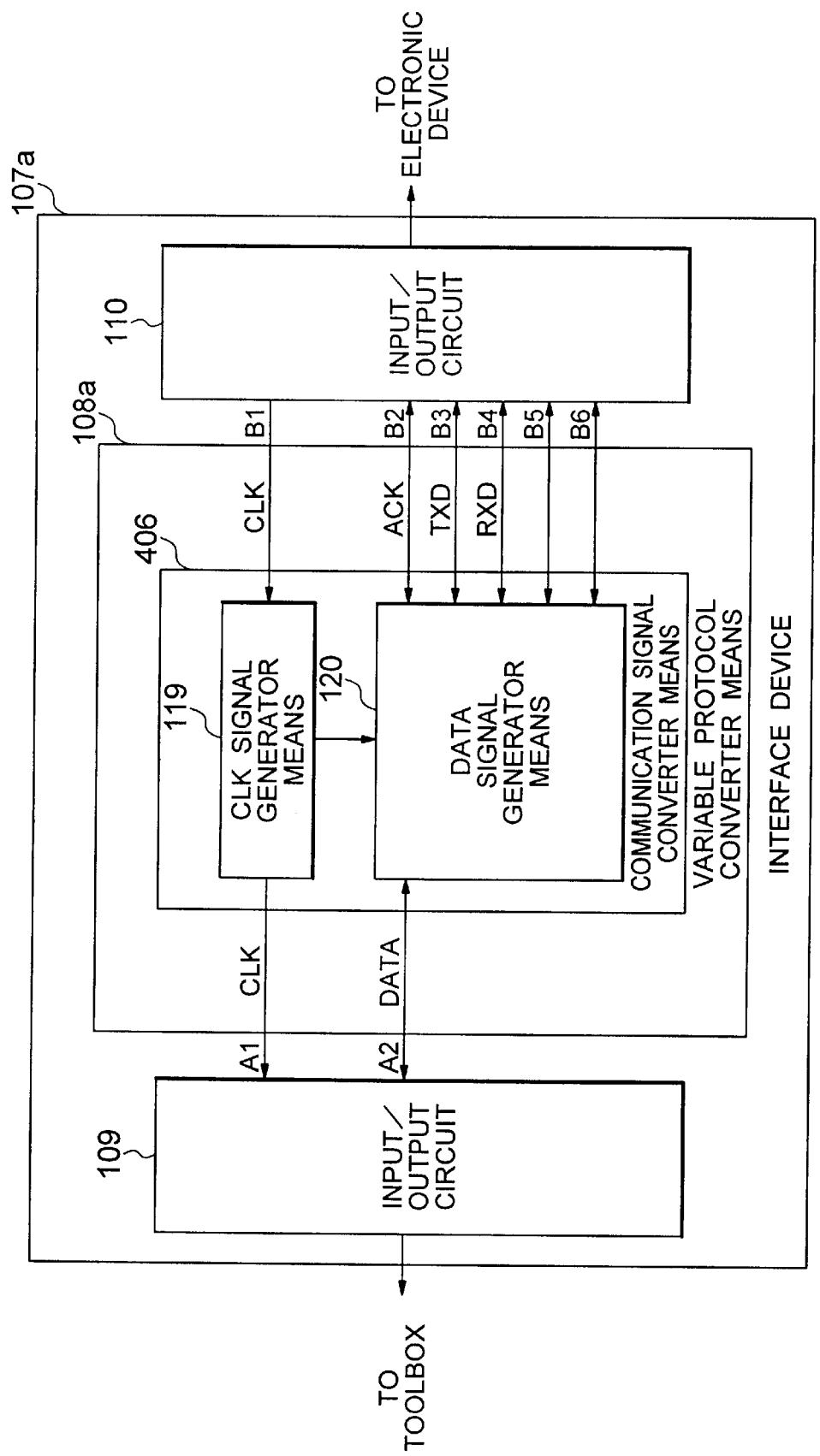
FIG. 7 shows one example of setting for the communication signal converter means installed in the variable protocol converter means within the interface device according to the present invention after the communication protocol was changed.

Changing the set information achieves the configuration of the interface 107a as shown in FIG. 7 (the set information changing means is omitted.) FIG. 7, the B1 terminal of the variable protocol converter means 108a is for CLK signal, the B2 terminal an ACK signal, the B3 terminal a TSK signal, and the B4 terminal an RXK signal, and required communication functions are assigned for the communication protocol RTD of the microcomputer 102 in the electronic control device 101.

When data is sent from the microcomputer 102 in the electronic control device 101 to the microcomputer 105 in the toolbox 104, a signal is sent from the B3 terminal TXD of the variable protocol converter means 108a to the data signal generator means 120. The data signal generator means 120 converts the signal to the communication protocol of the microcomputer 105 in the toolbox 104 to send it to the A2 terminal. If data is sent from the microcomputer 105 in the toolbox 104 to the electronic control device 101, data is sent from the microcomputer 105 via the A2 terminal and the communication protocol is converted to RTD in the data signal generator means 120 to send the data to the microcomputer 102 via the B4 terminal RXD.

As described above, even if the electronic control device 101 is changed and the communication protocol of the microcomputer 102 carried therein is changed, the communication between the electronic control device 101 and the toolbox 104 is achievable by changing the setting in the set information changing means 405 in the variable protocol converter means 108a.

Two types of communication protocols, SCIA and RTD, are described above as the communication protocol of the electronic control device 101. However, even if the communication protocol is changed to any specification, the communication between the electronic control device 101 and the toolbox 104 is achievable with the same processes as far as a desired protocol is preset to the variable protocol converter means 108a.

Similarly, when the interface device 107a and the electronic control device 101 or the toolbox 104 are connected with a parallel bus (not shown), the communication is also achievable with the same processes as far as the communication protocol to be applied to it is preset.

For simplified description, it is described that the interface device 107a has eight terminals to be used for the communication, here. However, it is obvious that it has a terminals, which corresponds to each type of communication protocols.

Also, in this embodiment, the interface device 107a and the toolbox 104 are described as separate devices. However, their functions may be integrated as functions for one device.

Embodiment 2

In the embodiment above, the communication voltage level of the electronic control device 101, which is set in the personal computer 106, is achieved by changing the voltage level of the communication terminal 1008 (see FIG. 2, etc.) of the communication signal converter means 406 in the protocol converter means 108a. However, it maybe achievable by following the processes below.

Figure 8:
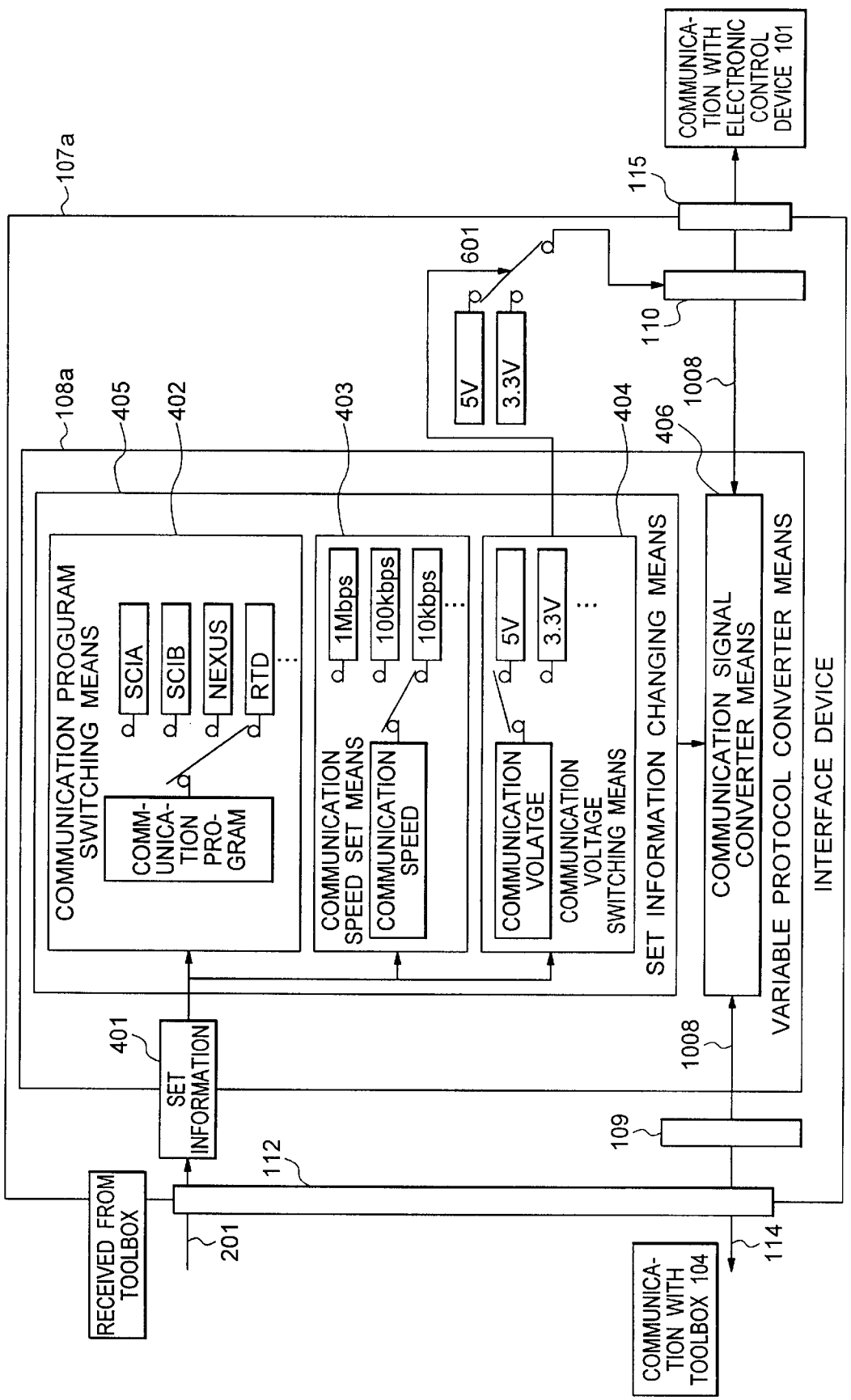
FIG. 8 shows an interface device for the communication protocol converter system according to an embodiment 2 of the present invention.

FIG. 8 shows the interface device 107a in this embodiment. FIG. 8 includes a communication circuit voltage switching circuit 601, which switches the voltage setting of the voltage switching means 404 in the set information changing means 405 based on the set information 401 sent from the toolbox 405. The communication voltage switching means 404 switches a power supply circuit of the communication circuit voltage switching means 601 so that the voltage supplied to the input/output circuit 109 is changed in order to change the communication voltage level with the microcomputer 102 in the electronic control device 101.

Embodiment 3

In the embodiment above, the communication protocol set information of the microcomputer carried in the electronic control device 101 is set in the personal computer 106 such that the variable protocol converter means 108 changes the communication program, the communication speed and the communication voltage based on the set information 401. Thus, the variable protocol converter means 108a is equipped with a program which can handle all communication protocols. However, it may be achievable by following a method described below.

Figure 9:
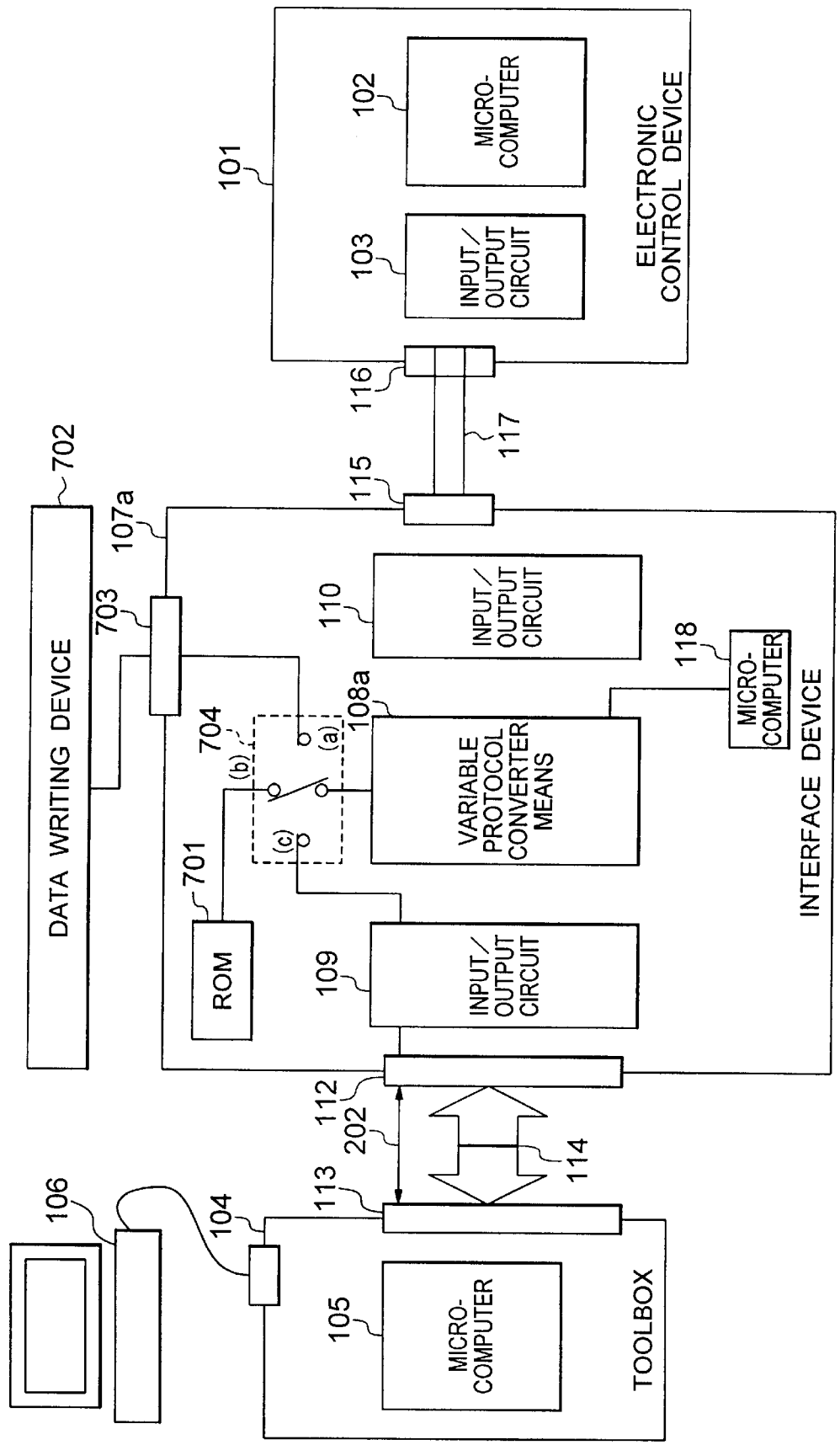
FIG. 9 shows a configuration of a control program development system including a communication protocol converter system according to an embodiment 3 of the present invention.

FIG. 9 shows a configuration of a control program development system including a communication protocol converter system according to this embodiment. FIG. 9 includes a ROM 701 in which a communication protocol control program, that is, a communication protocol is written, which corresponds to the set information changing means 405 of the embodiment above in the variable protocol converter means 108a. A data writing device 702 similarly rewrites the communication protocol control program in the variable protocol converter means 108a from the outside of the interface device 107a.

A connector 703 connects between a communication line of the data writing device 702 and the variable interface device 107a. A rewriting means selector means 704 selects a means for rewriting the communication protocol control program stored in the variable protocol converter means 108a and specifically is a switch attached on the interface device 107a.

If a selection by the switch 704 is set to (a) which is the data writing device 702, the communication protocol control program as a communication protocol is sent from the data writing device 702 to the variable protocol converter means 108a. The variable protocol converter means 108a writes the received communication protocol program into the area corresponding to the set information changing means 405 shown in FIG. 2 in order to change the program. Alternatively, it is possible the microcomputer 118 is installed on the interface device 107a and the communication protocol control program is sent from the data writing device 702 to the microcomputer 118 such that the microcomputer 118 rewrites the communication protocol control program of the variable protocol converter means 108a.

Next, the case where the selection of the switch 704 is set to (b), which is the ROM 701, will be described. First of all, the ROM 701 is loaded in the interface device 107a. Here, the communication protocol control program, the communication protocol, for converting to the communication protocol of the microcomputer 102 carried in the electronic control device 101 is written into the ROM 107. For example, the ROM 701 is composed by a package attached on a circuit substrate (not shown) within the interface device 107a. When the variable protocol converter means 108a identifies that the selection of the switch 704 is (b), it reads the communication protocol control program written into the ROM701 and writes it to the area corresponding to the set information changing means 405, shown in FIG. 2, of the variable protocol converter means 108a. In this case, too, the microcomputer 118 is installed on the interface device 107a so that the microcomputer 118 can read the communication protocol control program of the ROM 701 and write the communication protocol control program into the variable protocol converter means 108*a*.

Next, if the selection of the switch 704 is (c) which is a serial communication 202 with the toolbox 104, the serial communication from the personal computer 106 through the toolbox 104 provides the communication of the communication protocol control program of the variable protocol converter means 108*a*. When the variable protocol converter means 108*a* receives the communication protocol control program, it rewrites the communication protocol control program in the same manner as above. In this case, too, the microcomputer 118 installed on the interface device 107*a* can rewrite the communication protocol control program of the variable protocol converter means 108*a*.

The communication protocol rewriting means is composed by the data writing device 702, the ROM 701, the microcomputer 118, the personal computer 106 and their combination.

In the embodiment above, the switch 704 is a switch attached on the interface device 107*a*. However, the rewriting means may be selected by the personal computer 106.

Embodiment 4

In the embodiment above, the communication protocol of the variable protocol converter means 108*a* is specified to be set by a user. However, it may be achieved by following processes described below.

Figure 10:
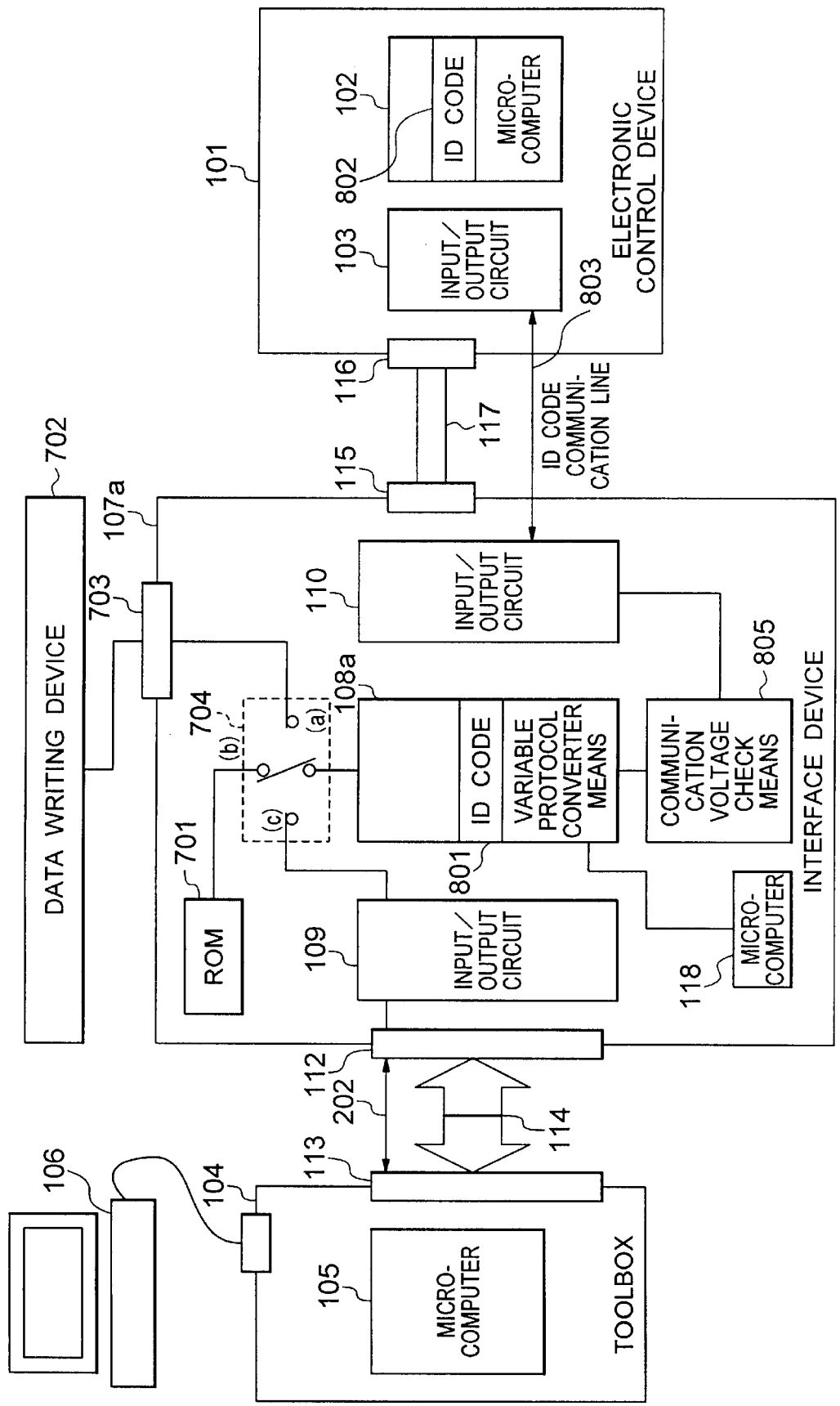
FIG. 10 shows a configuration of a control program development system including a communication protocol converter system according to an embodiment 4 of the present invention.

FIG. 10 shows a configuration of a control program development system including a communication protocol converter system according to this embodiment. FIG. 10 includes ID codes 801 and 802, an ID code communication line 803, and a communication voltage check means 805. The ID code 801 indicates protocol set information of the variable protocol converter means 108*a*, which is stored within the variable protocol converter means 108*a*. The ID code 802 indicates a communication protocol of the microcomputer 102 in the electronic control device 101. The ID code communication line 803 handles ID code communication between the interface device 107*a* and the electronic control device 101.

The variable protocol converter means 108*a* receives the ID code 802 of the microcomputer 102 in the electronic control device 101 through the ID code communication line 803. The variable protocol converter means 108*a* compares, in the microcomputer 118, the ID code 801 stored in the variable protocol converter means 108*a* and the ID code 802 received from the microcomputer 102 in the electronic control device 101. Further, it compares the communication voltage of the communication protocol of the ID code 802 received from the microcomputer 102 in the electronic control device 101 and the voltage level identified in the communication voltage check means 805. A match in the comparison results between those ID codes 801, 802 and the communication voltage level indicates that the protocol setting set in the variable converter means 108*a* is correct. As a result, the communication is continued with the protocol setting. ID codes 801 and 802 and the communication voltage level are communication protocol set information.

A mismatch between the ID codes 801 and 802 and the communication voltage level indicates that the protocol setting set in the variable protocol converter means 108*a* is not provided for the microcomputer 102 in the electronic control device 101. As a result, the variable protocol converter means 108*a* sets the protocol for the microcomputer 102 and then starts communication with the electronic control device 101.

Thus, even if the protocol setting set in the variable protocol converter means 108*a* is different from the setting of the microcomputer 102 in the electronic control device 101, the electronic control device 101 and the toolbox 104 can always communicate normally by changing the setting of the protocol converter means 108*a* in advance. Also, since the voltage level of the communication signal corresponds to the voltage level of the microcomputer 102 in the electronic control device 101 by changing the protocol setting, the destruction of the microcomputer can be prevented.

Embodiment 5

In the embodiment above, the variable protocol converter means 108*a* detects the mismatch between ID codes and changes the protocol setting of the variable protocol converter means 108*a*. However, it may be achieved by following processes described below.

Figure 11:
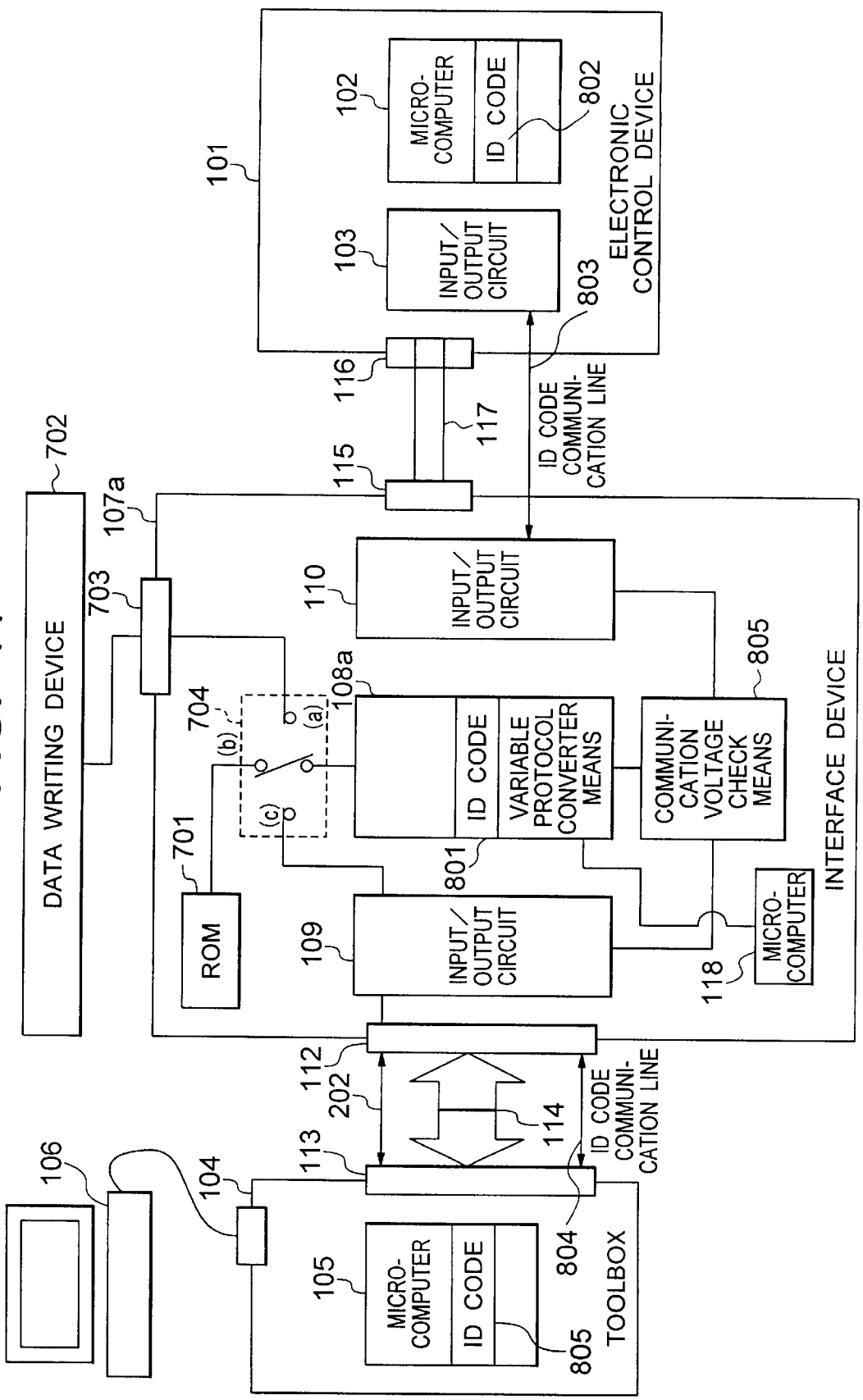
FIG. 11 shows a configuration of a control program development system including a communication protocol converter system according to an embodiment 5 of the present invention.

FIG. 11 shows a configuration of a control program development system including a communication protocol converter system according to this embodiment and includes an ID code communication line for connecting between the toolbox 104 and the interface device 107*a*.

Here, the variable protocol converter means 108*a* receives the ID code 802 of the microcomputer 102 in the electronic control device 101 and sends it along with the ID code 801 to the personal computer 106 through the toolbox 104 via the ID code communication line 804. The personal computer 106, which have received the ID codes of the variable protocol converter means 108*a* and the microcomputer 102, continues communication as is if the comparison results between the ID codes indicates their match. If it indicates their mismatch, an alarm by indication on a screen or a sound is generated toward a user and prompts to change the protocol setting of the variable protocol converter means 108*a*.

In the description above, the alarm is generated from the personal computer 106 to the user. However, the personal computer 106, which detects the mismatch between ID codes, may be specified to change the setting of the variable protocol converter means 108*a* automatically.

Embodiment 6

In the embodiment above, the protocol set information 401 of the variable protocol converter means 108*a* is set in the personal computer 106, as shown in FIG. 2, for example. However, it may be achieved by following a method described below.

Figure 12:
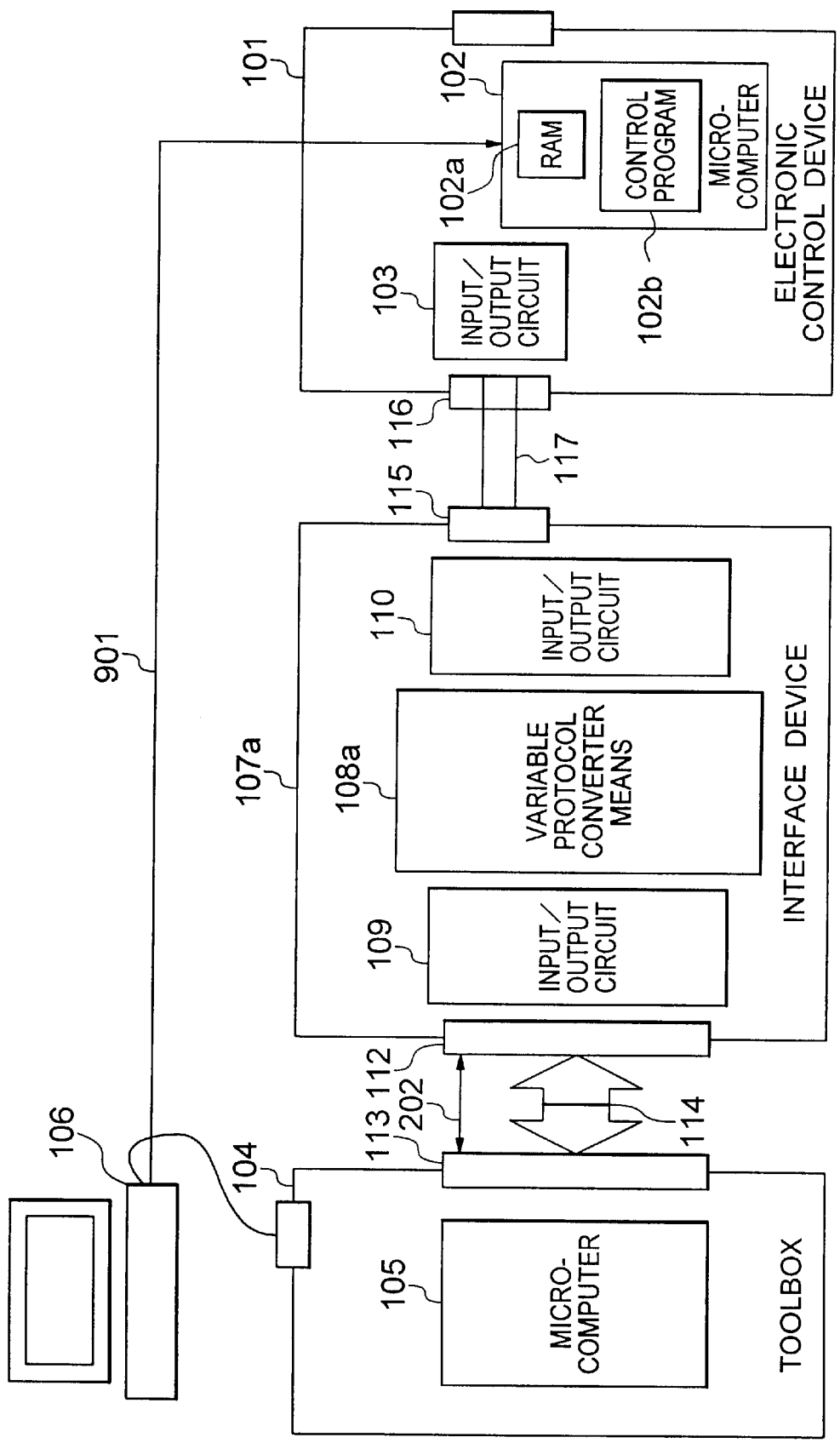
FIG. 12 shows a configuration of a control program development system including a communication protocol converter system according to an embodiment 6 of the present invention.

FIG. 12 shows a control program development system including a communication protocol converter system according to this embodiment and includes a signal line 901 for connecting between the personal computer 106 and the electronic control device 101. It will be described a method for changing a communication protocol control program of the variable protocol converter means 108*a* in a system, for rewriting a control program 102*b* of the microcomputer 102 in the electronic control device 101, which is created in the personal computer 106.

First of all, the control program 102*b* of the electronic control device 101 is created in the personal computer 106. Next, the program created in the personal computer 106 is compiled and linked for conversion to an executable program. Once the created program is linked and converted to the executable file, the personal computer 106 transfers the executable program to the electronic control device 101 via the signal line 901 and rewrites the control program 102*b* of the microcomputer in the electronic control device 101.

The personal computer 106 compiles and links the created program in order to determine a type name of a microcomputer, which uses the program. When the type name of the microcomputer can be determined, the personal computer 106 determined the communication protocol of the microcomputer 102 in the electronic control device 101 from the type name of the microcomputer and the protocol set information 401 to the variable protocol converter means 108a in the interface device 107a through the toolbox 104.

Embodiment 7

According to the embodiment above, when the communication protocol of the microcomputer 102 in the electronic control device 101 is changed, the setting of the variable protocol converter means 108a is changed to realize the communication between the electronic control device 101 and the toolbox 104. However, even if the toolbox 104 is changed to change the communication protocol of the microcomputer 105 while the communication protocol of the microcomputer 102 in the electronic control device 101 is the same, the communication between the electronic control device 101 and the toolbox 104 is achievable through the same method described above.

Further, the same processes as the above can be used for rewriting the communication protocol control program, that is, the communication protocol, of the variable protocol converter means 108a by using the ROM 701, the data writing device 702, and the personal computer 106, and for detecting, by providing an ID code to the microcomputer 105 within the toolbox 104, the set protocol of the variable protocol converter means 108a from the ID code.

Furthermore, the same method can be used to achieve the communication between the electronic control device 101 and the toolbox 104 by changing the communication protocol control program, that is, the communication protocol, of the variable protocol converter means 108a even if the communication protocol of the microcomputer 102 in the electronic control device 101 and the communication protocol of the microcomputer 105 in the toolbox 104 are both changed.

Figure 13:
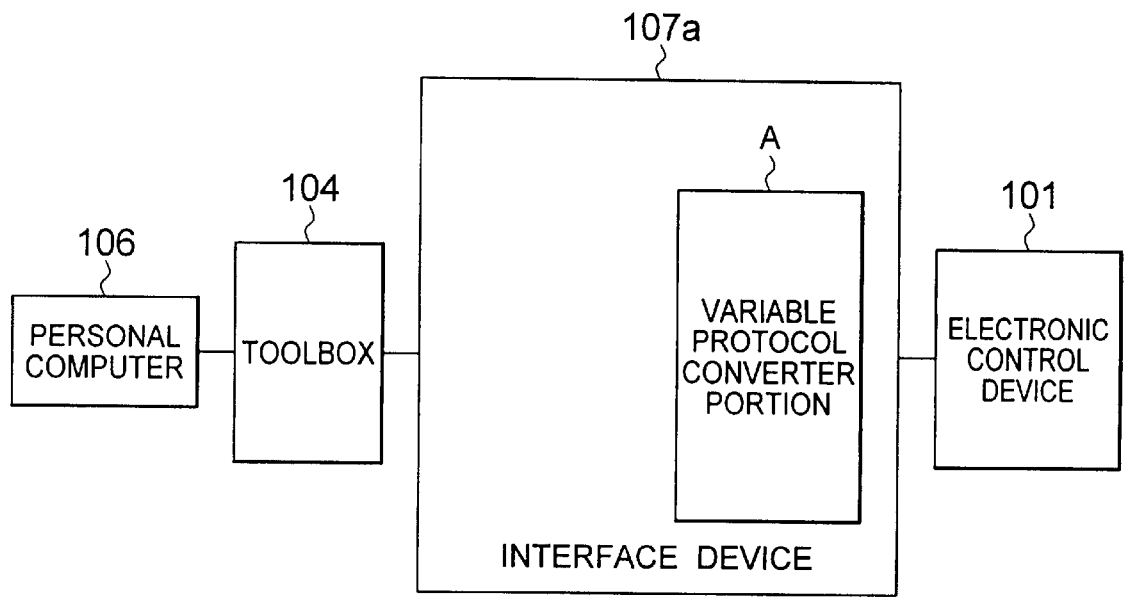
FIG. 13 is an explanatory diagram of a configuration of a control program development system including a communication protocol converter system according to an embodiment 7 of the present invention.
Figure 14:
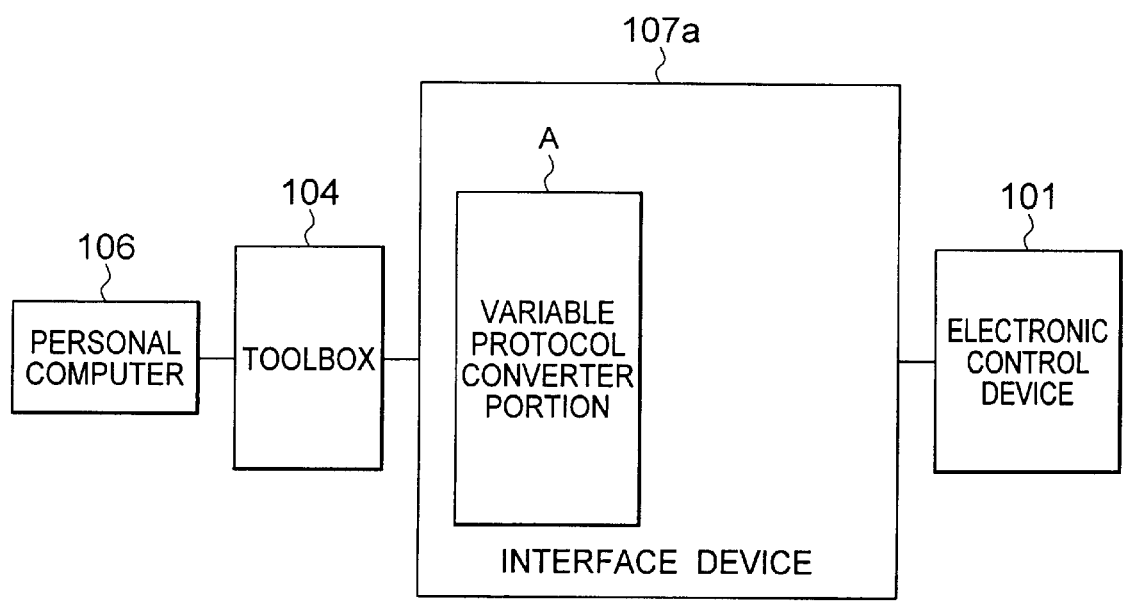
FIG. 14 is an explanatory diagram of the configuration of the control program development system including the communication protocol converter system according to the embodiment 7 of the present invention.
Figure 15:
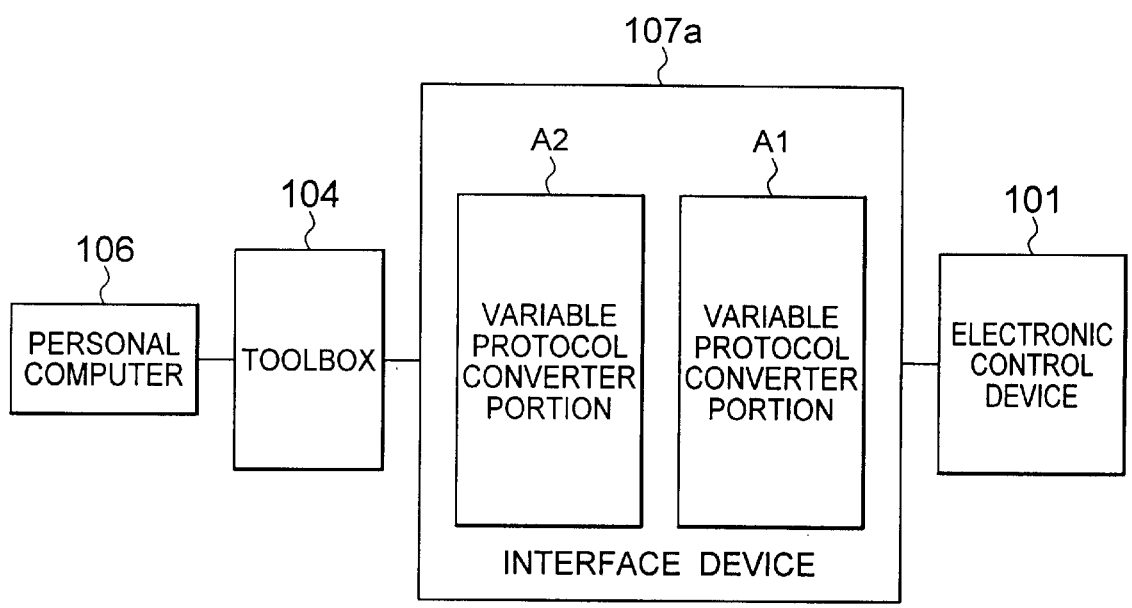
FIG. 15 is an explanatory diagram of the configuration of the control program development system including the communication protocol converter system according to the embodiment 7 of the present invention.

That is, as shown in FIG. 13 through FIG. 15, the variable protocol converter means 108a according to each embodiment described above, and the variable protocol converter portion A including apparatuses related to it may be equipped on the side of the electronic control device 101 as in each embodiment above, as shown in FIG. 13. Further, as shown in FIG. 14, they may be equipped on the side of the toolbox 104. Furthermore, as shown in FIG. 15, they may be equipped as variable protocol converter portions A1 and A2 on both side of the electronic control device 101 and the toolbox 104.

Embodiment 8

In the embodiment above, the interface device 107a is described which converts the communication protocols in order to achieve the communication between the electronic control device 101 and the toolbox 104. However, the protocol converting method described in the embodiment above is applicable to the case described below.

Figure 16:
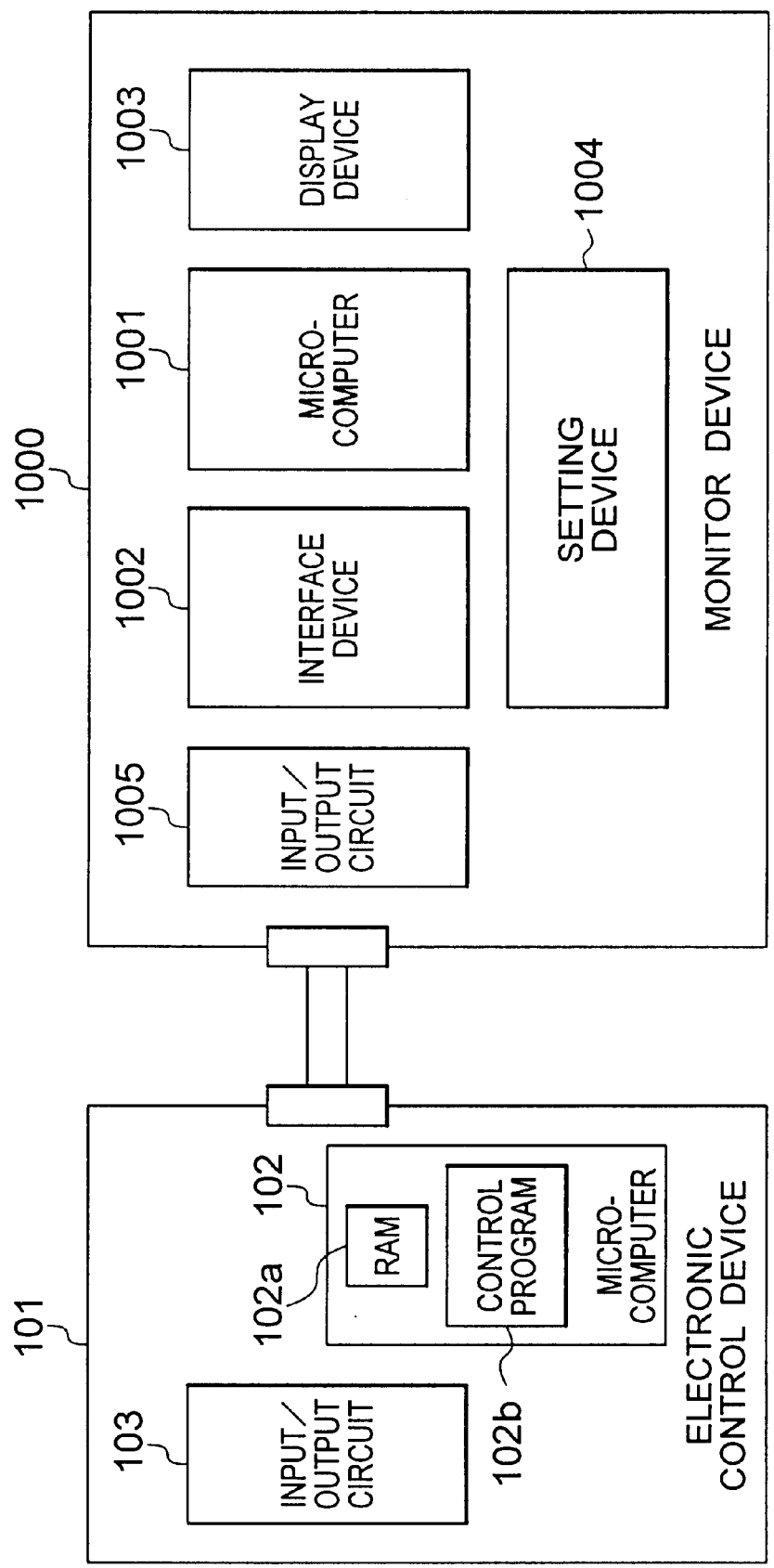
FIG. 16 is an explanatory diagram of a configuration of a monitor device according to an embodiment 8 of the present invention.
Figure 17:
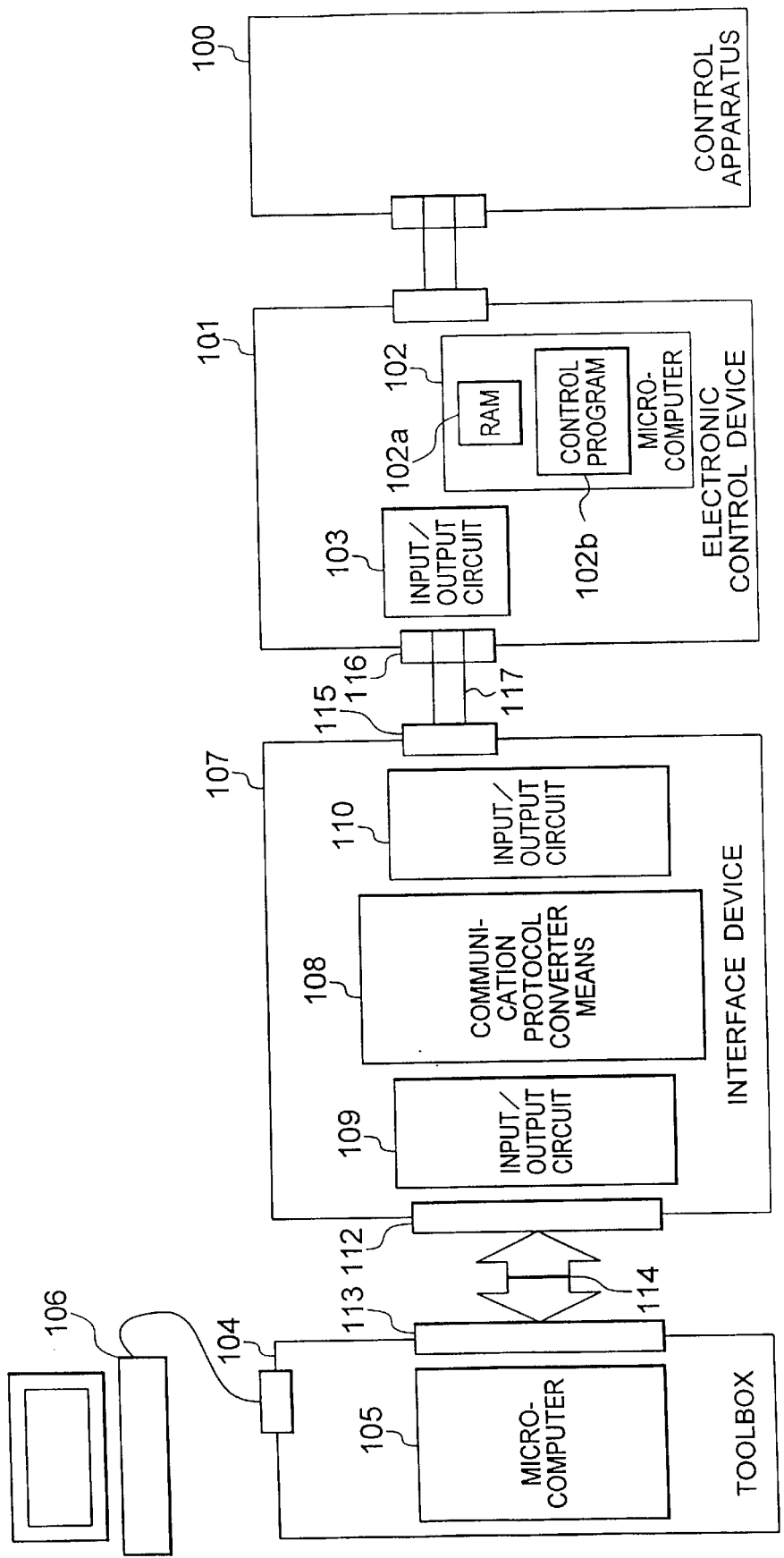
FIG. 17 shows a configuration of a control program development system including a conventional communication protocol converter system.
Figure 18:
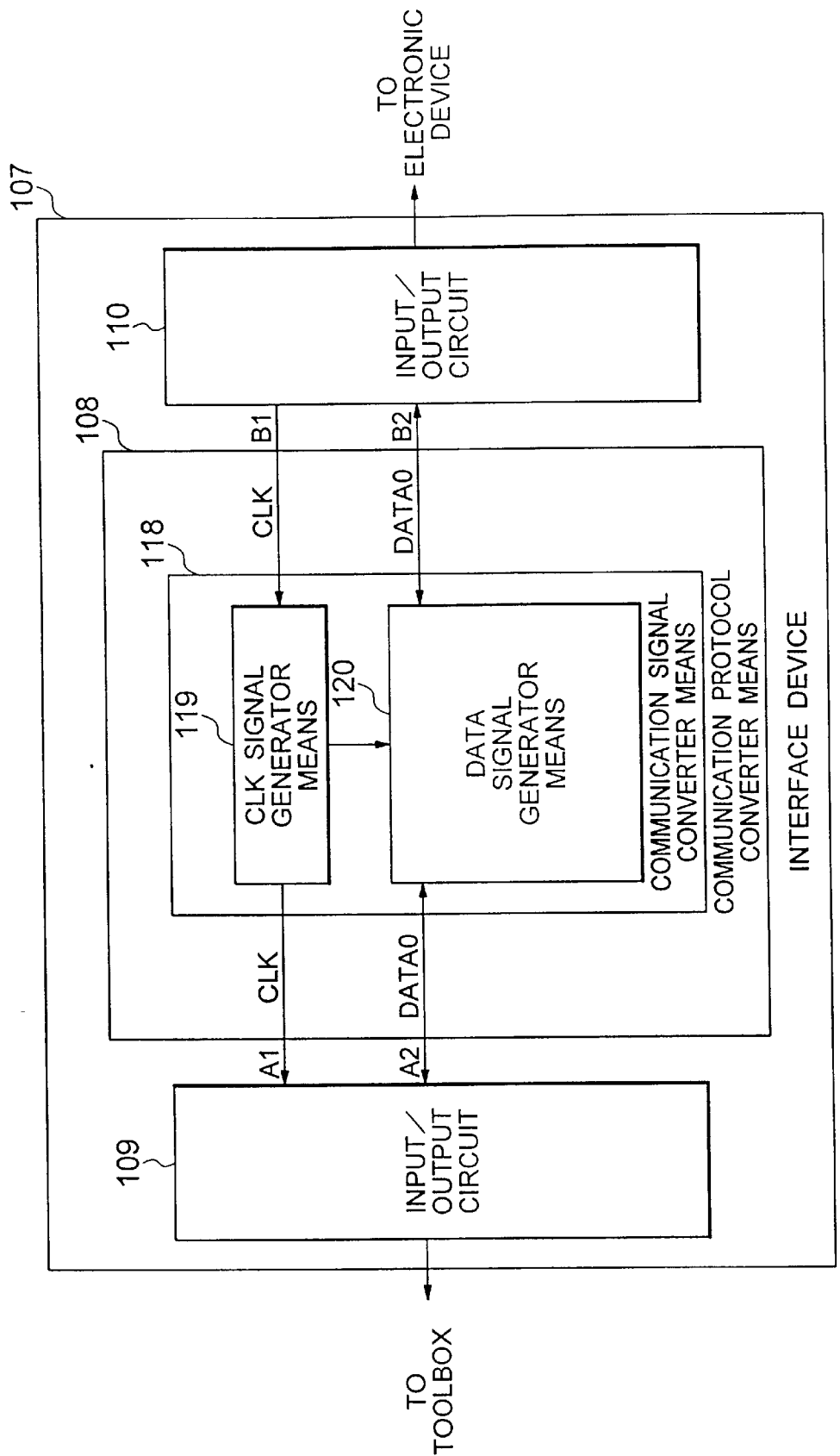
FIG. 18 shows a configuration of the interface device shown in FIG. 17 in more detail.

FIG. 16 shows a configuration of a monitor device of the present invention and internal configurations of an electronic control device 101 and a monitor device 1000, which is connected arbitrarily to each type of the electronic control device 101 to read contents, for example, data stored in a RAM 102a, within each electronic control device 101 for monitoring. FIG. 16 includes the monitor device 1000, a microcomputer 1001, an interface device 1002, a display device 1003, a setting device 1003, and an input/output circuit 1005. The monitor device 1000 displays a RAM values of the microcomputer 102 in the electronic control device 101. The interface device 1002 converts a communication protocol between the microcomputer 1001 in the monitor device 1000 and the microcomputer 102 in the electronic control device 101. The display device 1004 displays a RAM value. The setting device 1004 sets an address and the like of the RAM whose RAM value is displayed.

Next, operations will be described. First of all, an address of a RAM value to be checked in the microcomputer 102 in the electronic control device 101 is set in the setting means 1004. The microcomputer 1001 in the monitor device 1000 sends the RAM address information set to the setting device 1004 through the interface device 1002. Though not shown, the interface device 1002 is equipped with the protocol converting function described in each embodiment above, and the communication protocol of the microcomputer 1002 in the monitor device 1000 is converted to the communication protocol of the microcomputer 102 in the electronic control device 101 for communication.

The microcomputer 102 in the electronic control device 101, which has received the address information from the monitor device 1000, sends the RAM value at the address to the microcomputer 1001 in the monitor device 1000 through the interface device 1002. The microcomputer 1001 displays the received RAM information on the display device 1003.

The interface device 1002 can handle each type of communication protocols, similarly to the interface device 107 described above. Thus, the monitor device 1000 can be used commonly for any specification of the communication protocol of the microcomputer 102 in the electronic control device 101.

As described above, according to the first invention, a communication protocol converter system, comprises: an electronic control device with a microcomputer including a control program; a control and arithmetic portion with a microcomputer which operates a control program created externally by using an operation parameter from the electronic control device; and an interface device, which is connected between the control and arithmetic portion and the electronic control device, for converting a communication protocol between communication data in the control and arithmetic portion and communication data in the electronic control device; wherein the interface device includes a variable protocol converter means, which can change a communication protocol to handle one or both of the connected electronic control device and control and arithmetic portion in regard to one or both side of the electronic control device and control and arithmetic portion. Therefore, it can handle each type of electronic control device with a different communication protocol so that it can increases the wide usability of a communication protocol converter system while reducing the number of development of an interface device.

Further according to the second invention, in a communication protocol converter system, the variable protocol converter means stores a plurality of communication protocols in order to switch and change them in regard to one or both of the electronic control device and control and arithmetic portion. Therefore, the communication protocol can be changed easily within an interface device.

Further according to the third invention, in a communication protocol converter system, the variable protocol converter means changes a communication protocol based on a specification of communication protocol set information of one or both of the electronic control device and control and arithmetic portion for the variable protocol converter means through the control and arithmetic portion from the outside. Therefore, the communication protocol can be specified from the outside.

Further according to the fourth invention, in a communication protocol converter system, one or both of the electronic control device and control and arithmetic portion owns their communication protocol set information, respectively, and the variable protocol converter means switches a communication protocol setting based on the communication protocol set information. Therefore, a wrong communication protocol is not specified.

Further according to the fifth invention, in a communication protocol converter system, one or both of the electronic control device and control and arithmetic portion owns their communication protocol set information, respectively, and the communication protocol converter system comprises an external computing portion, which is connected to the control and arithmetic portion, for, in regard to one or both of the electronic control device and control and arithmetic portion, inputting communication protocol set information owned by the device and a communication protocol set in the communication protocol converter means and, then, if both of them are different, notifying it. Therefore, it can prevent destruction or the like of hardware due to mismatch of voltage levels in a communication circuit.

Further according to the sixth invention, the communication protocol converter system of the third invention comprises an external computing portion for writing a control program directly into the electronic control device, and this external computing portion determines a communication protocol used in the electronic control device in a process for converting a program form and a source program to an executable program and specifies communication protocol set information of the electronic control device for the variable protocol converter means externally through the control and arithmetic portion. Therefore, an external arithmetic and control portion can operate specification based on a program form of a control program for an electronic control device and a communication protocol determined in an conversion process to an executable program of a source program.

Further according to the seventh invention, a communication protocol converter system comprises: an electronic control device with a microcomputer including a control program; a control and arithmetic portion with a microcomputer, which operates a control program created in the outside by using an operation parameter from the electronic control device; an interface device with a variable protocol converter means, which is connected between the control and arithmetic portion and the electronic control device and can rewrite communication protocol to handle one or both of the connected electronic control device and control and arithmetic portion in regard to one or both side of the electronic control device and control and arithmetic portion, for converting a communication protocol between communication data of the control and arithmetic portion and communication data of the electronic control device; and a communication protocol rewriting means for rewriting a communication program of the variable protocol converter means depending on a communication protocol of a device being connected in regard to one or both side of the electronic control device and control and arithmetic portion.

Since it is possible to rewrite the communication protocol of the interface device, it can deal with each type of electronic control devices with different communication protocol, which increase wide usability of the communication protocol converter system while reducing the number of development of the interface device.

Further according to the eighth invention, in the communication protocol converter system of the seventh invention, the communication protocol rewriting means includes a ROM which is installed on the interface device for storing a communication protocol and a microcomputer for writing data stored in the ROM to a variable protocol converter means. Therefore, a ROM and a microcomputer allows easier communication protocol rewriting.

Further according to the ninth invention, in the communication protocol converter system of the seventh invention, the communication protocol rewriting means includes an external computing portion for writing a communication protocol into the variable protocol converter means externally through the control and arithmetic portion. It allows easy and free communication protocol rewriting from the outside through a control and arithmetic portion.

Further according to the tenth invention, in the communication protocol converter system of the seventh invention, the communication protocol rewriting means includes a writing device connected to the outside of the interface device for writing a communication protocol into the variable protocol converter means. Therefore, easy communication protocol rewriting is made possible only by connecting the writing device to the outside of the interface device.

Further according to the eleventh invention, in the communication protocol converter system of any of first through tenth inventions, the interface device is equipped with input/output circuits on the side of the electronic control device and on the side of the control and arithmetic portion, respectively, and the variable protocol converter means is equipped with a communication terminal and switches a voltage level in the input/output circuit by switching an input/output voltage level of the communication terminal based on a communication protocol set to the variable protocol converter means. Therefore, the voltage level of the input/output circuit can be switched with almost no additional hardware circuit.

Further, according to the twelfth invention, in the communication protocol converter system of any of first through tenth inventions, the interface device is equipped with input/output circuits on the side of the electronic control device and on the side of control and arithmetic portion, respectively, and a communication circuit voltage switching circuit for switching a communication voltage level thereof, and the variable protocol converter means switches the communication circuit voltage switching circuit based on a communication protocol set to the variable protocol converter means and, thereby, switches a voltage supplied to the input/output circuit in order to switch a voltage level of the input/output circuit. Therefore, the voltage level of the input/output circuit can be switched with almost no additional software circuit.

Further according to the thirteenth invention, a monitor device arbitrarily is connected to each type of electronic control device, which having a microcomputer built-in including a RAM for storing a control program for each controlled object and data, and the monitor device comprises an interface device according to any of the first through twelfth inventions on the side of an electronic control device for performing data communication with the electronic control device. Therefore, it can deal with each type of the electronic control device, which increases wide usability of the monitor device and reducing the number of the monitor device.

What is claimed is:

1. A communication protocol converter system, comprising:
an interface device, and external devices including an electronic control device and a control and arithmetic portion;
the electronic control device having a microcomputer including a control program;
the control and arithmetic portion having a microcomputer operating an externally created control program by using an operation parameter from said electronic control device;
the interface device being connected between the external devices, communicating with each of the external devices according to a respective communications protocol; and
a variable protocol converter means, included in the interface device, for communicating data between the external devices by performing a protocol conversion between the respective communications protocols of the external devices;
wherein the variable protocol converter means is adapted to implement a different communications protocol, in place of one of the respective communications protocols, for communication with one of the external devices;
whereby, when one of the external devices is changed to a different device, the interface device performs the protocol conversion and communicates with the different device according to the different communications protocol.

2. A communication protocol converter system according to claim 1, wherein said variable protocol converter means stores a plurality of communication protocols, and said different communications protocol is one of said plurality of communication protocols.

3. A communication protocol converter system according to claim 1, wherein:
said variable protocol converter means implements said different communication protocol based on communication protocol set information of one of the external devices; and
the set information is externally provided to said control and arithmetic portion, and then is provided from the control and arithmetic portion to the interface device.

4. A communication protocol converter system according to claim 1, wherein:
one of the external devices internally stores communication protocol set information, indicative of a communications protocol;
the communication protocol set information is provided to the variable protocol converter means; and
the variable protocol converter means implements the different communication protocol based on the communication protocol set information.

5. A communication protocol converter system according to claim 1, further comprising an external computing portion, connected to said control and arithmetic portion, wherein
one of the external devices internally stores communication protocol set information, indicative of a communications protocol;
the communication protocol set information of the external device is inputted to the external computing portion;
the external computing portion makes a comparison between the communication protocol set information of the external device and a communication protocol set in said variable communication protocol converter means; and
when the comparison indicates a difference, the external computing portion performs a notification operation.

6. A communication protocol converter system according to claim 3, further comprising an external computing portion, and wherein:
the external computing portion directly writes a control program into said electronic control device;
the external computing portion determines a communication protocol used in the electronic control device in a process for converting a source program to a program executable by the electronic control device; and
the external computing portion specifies, to the variable protocol converter means, the communication protocol set information of said electronic control device, through said control and arithmetic portion.

7. A communication protocol converter system, comprising:
an interface device, and external devices including an electronic control device and a control and arithmetic portion;
the electronic control device having a microcomputer including a control program;
the control and arithmetic portion having a microcomputer operating an externally created control program by using an operation parameter from said electronic control device;
the interface device, being connected between the external devices, communicating with each of the external devices according to a respective, rewritably stored communications protocol;
a variable protocol converter means included in the interface device, communicating data between the external devices by performing a protocol conversion between the respective communications protocols of the external devices; and
a communication protocol rewriting means for rewriting a communication program of said variable protocol converter means to implement a different communications protocol in place of one of the rewritably stored communications protocols;
whereby, when one of the external devices is changed to a different device, the interface device performs the protocol conversion and communicates with the different device according to the different communications protocol.

8. A communication protocol converter system according to claim 7, wherein the interface device further comprises:
a ROM, of said communication protocol rewriting means, for storing a communication protocol; and
a microcomputer for writing data stored in the ROM to the variable protocol converter means.

9. A communication protocol converter system according to claim 7, wherein said communication protocol rewriting means includes an external computing portion for writing a communication protocol into said variable protocol converter means, through said control and arithmetic portion.

10. A communication protocol converter system according to claim 7, wherein said communication protocol rewriting means includes a writing device, connected to the outside of said interface device, for writing a communication protocol into said variable protocol converter means.

11. A communication protocol converter system according to claim 1, wherein:
   said interface device is equipped with input/output circuits on the side of said electronic control device and on the side of said control and arithmetic portion, respectively;
   said variable protocol converter means is equipped with a communication terminal; and
   said variable protocol converter means switches a voltage level in said input/output circuit by switching an input/output voltage level of said communication terminal, based on a communication protocol set to said variable protocol converter means.

12. A communication protocol converter system according to claim 7, wherein:
   said interface device is equipped with input/output circuits on the side of said electronic control device and on the side of said control and arithmetic portion, respectively;
   said variable protocol converter means is equipped with a communication terminal; and
   said variable protocol converter means switches a voltage level in said input/output circuit by switching an input/output voltage level of said communication terminal, based on a communication protocol set to said variable protocol converter means.

13. A communication protocol converter system according to claim 1, wherein:
   said interface device is equipped with input/output circuits on the side of said electronic control device and on the side of control and arithmetic portion, respectively, and a communication circuit voltage switching circuit for switching a communication voltage level thereof;
   said variable protocol converter means switches said communication circuit voltage switching circuit based on a communication protocol set to said variable protocol converter means; and
   said variable protocol converter means switches a voltage supplied to said input/output circuit, by the switching of the communication circuit voltage switching circuit, to switch a voltage level of said input/output circuit.

14. A communication protocol converter system according to claim 7, wherein:
   said interface device is equipped with input/output circuits on the side of said electronic control device and on the side of control and arithmetic portion, respectively, and a communication circuit voltage switching circuit for switching a communication voltage level thereof;
   said variable protocol converter means switches said communication circuit voltage switching circuit based on a communication protocol set to said variable protocol converter means; and
   said variable protocol converter means switches a voltage supplied to said input/output circuit, by the switching of the communication circuit voltage switching circuit, to switch a voltage level of said input/output circuit.

15. A monitor device for arbitrary connection to any one of a plurality of electronic control devices, each of the electronic control devices having a respective microcomputer and respective control program, the monitor device comprising:
   a built-in microcomputer, RAM storing a control program of the built-in microcomputer, and an interface device;
   the interface device being coupled between the microcomputer of the monitor and a given one of the electronic control devices;
   the interface device communicating with the given electronic control device according to a respective communications protocol of the electronic control device; and
   the interface device comprising a variable protocol converter means for communicating data between the given electronic control device and the microcomputer of the monitor by performing a protocol conversion for the communications protocols of the given electronic control device and the monitor;
   wherein the variable protocol converter means is adapted to implement a different communications protocol, in place of the communications protocol of the given electronic control device, for communication with one of the other ones of the plurality of electronic control devices.

16. A monitor device for arbitrary connection to any one of a plurality of electronic control devices, each of the electronic control devices having a respective microcomputer and respective control program, the monitor device comprising:
   a built-in microcomputer, RAM storing a control program of the built-in microcomputer, and an interface device;
   the interface device being coupled between the microcomputer of the monitor and a given one of the electronic control devices;
   the interface device communicating with the given electronic control device according to a respective, rewritably stored communications protocol of the electronic control device;
   the interface device comprising a variable protocol converter means for communicating data between the given electronic control device and the microcomputer of the monitor by performing a protocol conversion for the communications protocols of the given electronic control device and the monitor; and
   the interface device comprising a communication protocol rewriting means for rewriting a communication program of said variable protocol converter means to implement a different communications protocol in place of one of the rewritably stored communications protocol;
   whereby, when the given one of the electronic control devices is changed to a different one of the plurality of electronic control devices, the interface device communicates with the different electronic control device and performs the protocol conversion according to the different communications protocol.

* * * * *